April 17, 1962  M. J. SCHULTZ ET AL  3,029,860
TIRE MOUNTING TOOL
Filed Feb. 17, 1959
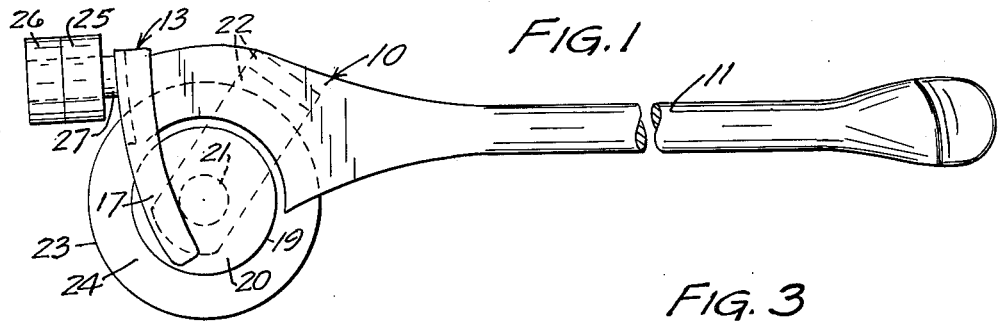
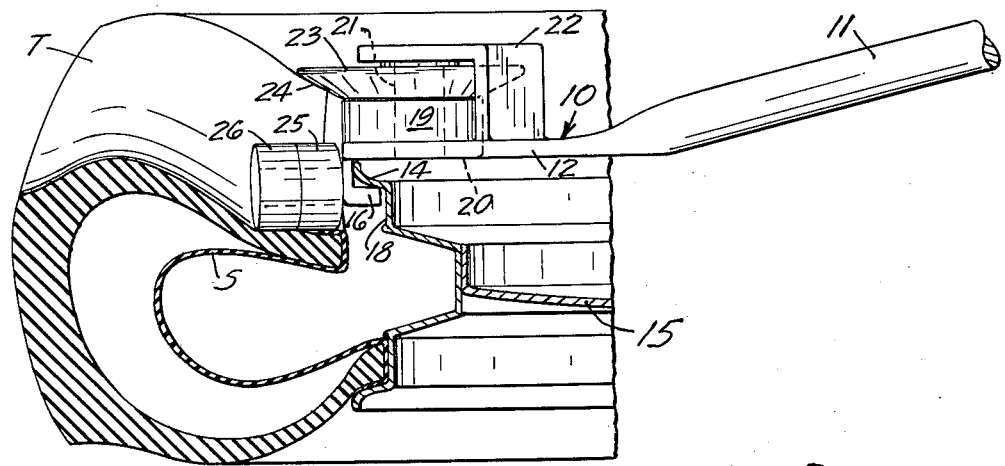
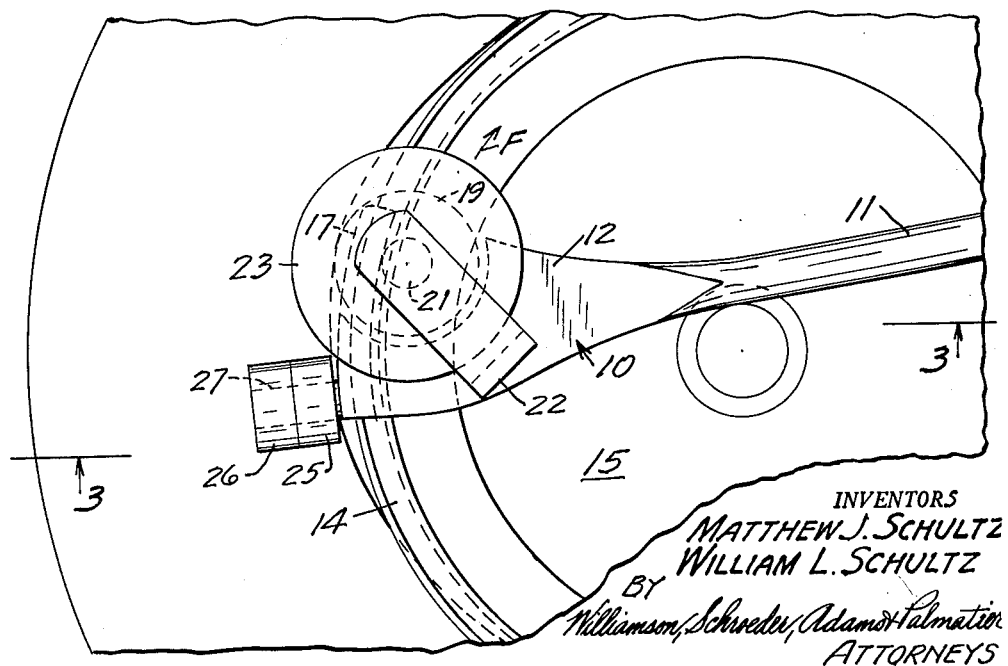
INVENTORS
MATTHEW J. SCHULTZ
WILLIAM L. SCHULTZ
BY Williamson, Schroeder, Adams & Palmatier
ATTORNEYS United States Patent Office 3,029,860
Patented Apr. 17, 1962

3,029,860
TIRE MOUNTING TOOL
Matthew J. Schultz and William L. Schultz, Red Lake Falls, Minn., assignors, by mesne assignments, to Red Lake County State Bank, Red Lake Falls, Minn., a corporation of Minnesota
Filed Feb. 17, 1959, Ser. No. 793,747
2 Claims. (Cl. 157—1.22)

This invention relates to tire mounting tools and more specifically relates to an improvement in tire mounting tools so as to adapt the same for use with modern tubeless tires.

It is believed well to point out that tubeless tires are constructed adjacent the tire bead, so that the rubber at the rim-engaging surfaces of the bead, is somewhat softer than other portions of the tire. It has been found that if the rubber of the rim-engaging bead is wrinkled during application of the tire to the wheel, air leaks may occur. It should further be recognized that safety shields used with tubeless tires have marginal edge portions which wrap around the bead of the tubeless tire. These marginal edge portions are also substantially more pliable than the tire construction and wrinkling thereof also causes leaks to occur adjacent the wheel rim.

With these comments in mind, it is to the correction of difficulties incurred in the mounting of tubeless tires, with or without safety shields, that the present invention is directed, along with the inclusion therein of other novel and desirable features.

An object of our invention is to provide a new and improved tire mounting tool of simple and inexpensive construction and operation for use particularly with tubeless tires, but adapted for use with other types of tires as well.

Another object of our invention is the provision of a novel tire mounting tool which substantially eliminates the possibility of causing wrinkling of the rubber in the bead of the side of the tire during installation of the tire on the wheel rim.

A further object of our invention is to provide a novel and improved tool for use in mounting a tire on a wheel rim which is constructed in such a manner that there is no skidding or sliding of any surfaces of the tool along surfaces of the rubber of the tire, and all surfaces of the tool which engage the tire will roll on the rubber to substantially eliminate any possibility of wrinkling of the rubber in the tire.

These and other objects and advantages of our invention will more fully appear from the following description made in connection with the accompanying drawings wherein like reference characters refer to the same or similar parts throughout the several views and in which:

FIG. 1 is a bottom plan view, partly broken away of the invention;

FIG. 2 is a top plan detail view of the invention shown applied to an automobile wheel and being used in mounting a tire thereon; and FIG. 3 is a section view through a wheel substantially at 3—3 in FIG. 2 and showing the tool in side elevation.

One form of the present invention is shown in the drawings and is described herein. The tire mounting tool includes a rigid frame 10 of which handle 11 is integral. The head portion 12 of the frame is of generally flattened shape and is provided with means, indicated in general by numeral 13 for guiding the tool around the rim flange 14 of an automobile wheel 15. Such means include a hook portion 16 on the outer end of the head 12 and defining an elongated arcuate shoe 17 which projects from one side edge of the underside of the frame in a forward direction relative to the direction of movement of the wheel around the tool rim as indicated by the arrow F in FIG. 2. The shoe 17 is adapted to engage the tire bead mounting rim surface 18 of the wheel 15.

The tool 10 is also provided with means for engaging and lifting the tire bead over the edge of the rim flange 14, and in the form shown such means comprise a wheel 19 having a cylindrical peripheral surface and having a generally planar inner end surface 20 which is adapted to lie against the outer edge of the rim flange 14. Wheel 19 is rotatably mounted on a stud 21 which is affixed on a mounting flange 22 which is affixed as by welding to the head 12 of the tool. The cylindrical wheel 19 is positioned with respect to the hook portion 16 and shoe 17 so that a portion of the peripheral surface of the wheel 19 is disposed radially outwardly from the edge of the rim flange so that the tire bead which is engaged by the wheel 19 is lifted over the edge of the rim flange.

Means are also provided for guiding the sidewall of the tire T inwardly toward the rim flange so as to be subsequently guided behind the rim flange after the tire leaves the wheel 19. In the form shown, such guiding means comprise a circular disc 23 which is journalled on the stud 22 for rotation by itself and free from the wheel 19. The disc 23 has a tapering or flared inner surface 24 which converges inwardly toward the periphery of the wheel 19.

The tool 10 is also provided with roller means for engaging the tire sidewall and bead and moving the same behind the wheel rim flange 14. In the form shown, such means comprise a pair of coaxial rollers 25 and 26 which are journalled on a stud 27 which is rigid with the hook portion 16 of the head 12. The rollers 25 and 26 revolve on an axis which extends generally radially of the wheel 15 and the rollers 25 and 26 have peripheral portions which are disposed inwardly of the wheel rim flange 14 so as to move the sidewall of the tire therebehind.

When the wheel 15 is mounted horizontally on a stand which has an upright post P projecting through the central hub opening of the wheel 15, the tire will be applied to the rim so that the first bead is contained on the rim. The mounting of the second bead on the rim is then accomplished by use of the tool 10. The hook portion 16 of the head is slipped over the rim flange and the shoe 17 is guided on the surface 18 of the wheel. The frame or handle 11 is caused to bear against the post P of the stand and by exerting pressure on the outer end of the handle, the head 12 is moved in the direction of arrow F around the wheel. The sidewall of the tire is initially guided behind the disc 23 and over the periphery of the wheel 19 and behind the rollers 24 and 25. As the head 12 of the tool is moved in the direction of the arrow F, the wheel 19 moves the bead of the tire T outwardly over the edge of the rim flange 14. The disc 23 engages the tire sidewall at a position outwardly from the bead thereof, and along the portion of the tire sidewall that bulges outwardly. It will therefore be understood that because the disc 23 engages the tire sidewall at a position substantially outwardly from the periphery of wheel 19, the disc 23 will revolve at a different speed than the wheel 19. Because the disc 23 is individually rotatable regardless of the wheel 19, the head 12 may be moved along the wheel rim and tire sidewall without any substantial friction occurring between any of the parts of the head and the tire sidewall and bead. It should be noted that the tire T may have a safety shield S therein which does not change the operation of the tool whatsoever. The marginal edge portion of the safety shield S wraps around the tire bead and the wheel 19 rolls along this marginal portion of the shield S for urging the tire bead and sidewall radially outwardly over the edge of the rim flange.

As the head progresses in the direction of arrow F, the tire sidewall is moved inwardly behind the rim flange 14 by the rollers 25 and 26 and the bead of the tire is thereafter drawn down into engagement with the surface 18 by the tire itself. The rollers 25 and 26 may also revolve at slightly different speeds with respect to each other so as to permit easy movement of the tool over the tire sidewall. It should be noted that the outer roller 26 engages the tire sidewall at a position slightly outwardly from the roller 25 and therefore will have a different speed as it rolls along the tire sidewall.

It will therefore be seen that as the head 12 is progressively moved in the direction of arrow F around the wheel rim, the tire sidewall is moved over the rim flange and then therebehind for mounting on the surface 18. All of the engagement with the rubber tire sidewall and bead and safety shield is at rolling surfaces so as to maintain the friction between the tool and the tire sidewall at an absolute minimum and therefore the movement of the tool around the tire sidewall is accomplished without any skidding or wrinkling of the rubber.

It will, of course, be understood that various changes may be made in the form, detail, arrangement and proportion of the parts without departing from the scope of our invention which consists of the matter described herein and set forth in the appended claims.

What we claim is:

1. A tool for use in mounting a tire on a wheel rim, comprising a frame, means guiding the frame along the wheel rim flange, a tire bead-engaging wheel journalled on the frame and having a cylindrical periphery and an inner end adjacent the outer side of the rim flange and having an outer end, a portion of the cylindrical periphery of the wheel being disposed radially outwardly of the edge of the rim flange to carry the tire bead outwardly of the rim flange, a rotary disc journalled on the frame at the outer end of the wheel and coaxial therewith and being substantially larger in diameter than the bead-engaging wheel, said disc having a frustro-conical tire-engaging surface converging in angular relation to the cylindrical periphery of the bead-engaging wheel to bear against and roll along the outside of the tire sidewall, and a pair of tire bead and sidewall-engaging rollers coaxially journalled on the frame for rotation about an axis extending generally radially of the wheel rim and at a position radially outwardly from the rim flange and behind the bead-engaging wheel with respect to the direction of travel of the tool around the rim flange, said rollers having bead and sidewall engaging peripheral surface portions disposed behind the rim flange for guiding and forcing the tire sidewall behind the rim flange as the tool is moved around the periphery of the wheel, whereby the tire sidewall and bead is guided by rolling surfaces outwardly beyond the edge of the rim flange and then therebehind.

2. A tool for use in mounting a tire on a wheel rim, comprising a frame movable around the periphery of the rim and adapted to engage the rim flange, means on the frame and attachable with the rim for maintaining the frame in predetermined orientation with the rim flange and including an arcuate elongated shoe behind the rim flange and engaging the bead-supporting rim surface of the wheel, a tire bead-engaging wheel journalled on the frame and having an inner end confronting the outer side of the rim flange and having an outer end, a portion of the periphery of the wheel being disposed radially outwardly of the edge of the rim flange to carry the tire bead outwardly of the rim flange, a rotary disc journalled on the frame at the outer end of the bead-engaging wheel and coaxial therewith and being substantially larger in diameter than the bead-engaging wheel, said disc having a tire-engaging surface in angular relation with the wheel periphery to bear against and roll along the outside of the tire sidewall, said bead-engaging wheel engaging the tire at a position located intermediate the ends of said shoe, and means adjacent the bead-engaging wheel for guiding and forcing the tire sidewall behind the rim flange.

References Cited in the file of this patent

UNITED STATES PATENTS

| | | |
|---|---|---|
| 786,611 | Threlfall | Apr. 4, 1905 |
| 965,076 | Carle | July 19, 1910 |
| 1,025,987 | Long | May 14, 1912 |
| 1,307,131 | Kimbel | June 17, 1919 |
| 2,482,789 | Moore | Sept. 27, 1949 |
| 2,505,172 | Coats | Apr. 25, 1950 |
| 2,556,024 | Bourdon et al. | June 5, 1951 |
| 2,569,789 | Weaver | Oct. 2, 1951 |
| 2,581,569 | Zugaro et al. | Jan. 8, 1952 |

FOREIGN PATENTS

| | | |
|---|---|---|
| 208,944 | Australia | Nov. 17, 1955 |